US005478992A

United States Patent [19]

Hamada et al.

[11] Patent Number: 5,478,992

[45] Date of Patent: Dec. 26, 1995

[54] MANAGEMENT APPARATUS AND AUTOMATED TELLER MACHINE

[75] Inventors: Yasunori Hamada, Tsuchiura; Junichi Oizumi, Ibaraki; Haruo Yamanaka, Seto, all of Japan

[73] Assignee: Hitachi, Ltd., Tokyo, Japan

[21] Appl. No.: 362,751

[22] Filed: Dec. 22, 1994

Related U.S. Application Data

[63] Continuation of Ser. No. 171,778, Dec. 22, 1993, abandoned, which is a continuation of Ser. No. 746,995, Aug. 19, 1991, abandoned.

[30] Foreign Application Priority Data

Aug. 29, 1990 [JP] Japan .................................... 2-225311

[51] Int. Cl.$^{6}$ ...................................................... G06F 17/60

[52] U.S. Cl. .......................... 235/379; 235/381; 235/454; 902/11; 902/12; 902/15; 902/17; 209/534; 209/583; 209/551

[58] Field of Search .................................... 235/379, 454, 235/449, 381; 382/7; 902/11, 12, 15, 17; 209/534, 583, 551

[56] References Cited

U.S. PATENT DOCUMENTS

| | | | |
|---|---|---|---|
| 4,442,541 | 4/1984 | Finkel et al. | 209/534 |
| 4,787,518 | 11/1988 | Yuge et al. | 235/379 |
| 4,830,742 | 5/1989 | Takesako | 235/379 |
| 4,947,321 | 8/1990 | Spence | 364/401 |

FOREIGN PATENT DOCUMENTS

| | | | |
|---|---|---|---|
| 0164717 | 12/1985 | European Pat. Off. | 235/379 |
| 280436 | 8/1988 | European Pat. Off. . | |
| 3325181 | 1/1984 | Germany . | |

*Primary Examiner*—Donald Hajec
*Assistant Examiner*—Mark S. Tremblay
*Attorney, Agent, or Firm*—Antonelli, Terry, Stout & Kraus

[57] ABSTRACT

When sheets are taken into a machine or discharged from the machine, characteristics of these sheets such as letters or symbols of these sheets are read by a sheet characteristics reading unit. A result of reading the characteristics is stored in a storage unit. When characteristics of a sheet are not able to be read at the time of accommodating sheets, this sheet is returned and only sheets of which characteristics have been able to be read are taken into the machine. Sheets of which characteristics are not able to be read at the time of discharging sheets are specified by a unit for specifying sheets of which characteristics can not be read. By this arrangement, each sheet in the machine is always managed.

7 Claims, 17 Drawing Sheets

MANAGEMENT APPARATUS AND AUTOMATED TELLER MACHINE

This is a continuation of application Ser. No. 171,778 filed on Dec. 22, 1993, now abandoned, which is a continuation of application Ser. No. 746,995 filed on Aug. 19, 1991, now abandoned.

BACKGROUND OF THE INVENTION

FIELD OF THE INVENTION

The present invention relates to a sheet management device for managing sheets one by one, and particularly relates to the paper management device for managing a stock level of negotiable securities such as paper-moneys, share-certificates, bonds, etc., and an automated teller machine having this management device.

As one of the above type of devices, there is a cash automatic payment system according to which number printed on paper-moneys are read at the time when these paper-moneys are accommodated and the orders in which the paper-moneys are accommodated are stored, and when these paper-moneys are paid back, these stored numbers are read again and are compared with the order in which the numbers were stored, as disclosed in JP-A- 55-41570, for example.

According to the above-described prior-art technique, when paper-moneys are paid back, a cash automatic payment device reads numbers printed on paper-moneys and makes payment of paper-moneys by comparing the printed numbers of these paper-moneys with the printed numbers of the paper-moneys which were read when the paper-moneys were received, and therefore, in this prior-art technique, no consideration has been given to the management of stock levels of the paper-moneys stored in the cash automatic payment device. Further, in the above prior-art technique, no description has been made about how to process paper-moneys of which printed numbers are not able to be read when reading printed numbers of the paper-moneys at the time of taking these paper-moneys into the device. Further, in the above prior-art technique, no description has been made about a method of storing parts of printed numbers of cash-moneys thereby to specify all the paper-moneys in the device or about a system of reading printed numbers of cash-moneys for each set number of paper-moneys for recording in the device.

SUMMARY OF THE INVENTION

It is an object of the present invention to provide a system for automatically managing, in real time, all the sheets including sheets that have been received in a device, sheets that are discharged from the device and sheets that can not be discharged from the device.

It is another object of the present invention to provide a sheet management device of which storage area can be reduced by storing only parts of letters or symbols of each sheet without storing all the letters or symbols, or by storing the sheets in the storage for each set number of sheets.

Further, it is still another object of the present invention to provide a device which collectively displays in real time the state of sheets that have been processed in the device.

According to the present invention, the device of the invention reads information which represents characteristics of each sheet to be taken into the device, takes into the device only the sheets of which information has been able to be read, and stores the read information in the sequence of accommodating the sheets in the device. When discharging the sheets from the device, the device reads the information representing the characteristics of the sheets to be discharged, and checks coincidence of the information of the sheets that have been read with the information of the sheets stored previously, so that the device manages each of the individual sheets.

Those sheets to be discharged of which information showing the characteristics of the sheets have not been able to be read are stored in the device, and sheets are specified based on the information stored previously, so that the device manages completely each one of the sheets stored in the device.

According to the present invention, since the device of the present invention reads information which shows characteristics of each sheet to be taken into the device and takes into the device only the sheets of which information has been able to be read, it is possible to confirm all the sheets that are taken into the device. Further, since the device can store information of sheets in the sequence of accommodating the sheets in the device, it is easy to retrieve positions at which the sheets are accommodated. Further, when discharging the sheets from the device, since the device reads the information showing the characteristics of the sheets to be discharged and checks coincidence of the information of the sheets that have been read with the information of the sheets stored previously, it is possible to specify the sheets to be discharged. Further, since the device keeps storing in it those sheets which are to be discharged but information of which that shows the characteristics of the sheets have not been able to be read and since the device can specify those sheets of which information has not been able to be stored and thus kept stored in the device, based on the information that has been able to be read and the information stored previously, it is possible to manage completely the sheets within the device. Further, it is possible to complete the management of sheets while taking sheets into the device or while discharging sheets from the device, so that the device does not require any manpower or time for the management.

DESCRIPTION OF THE PREFERRED EMBODIMENTS

Details of the sheet management device according to the present invention will be explained with reference to the drawings.

Figure 1:
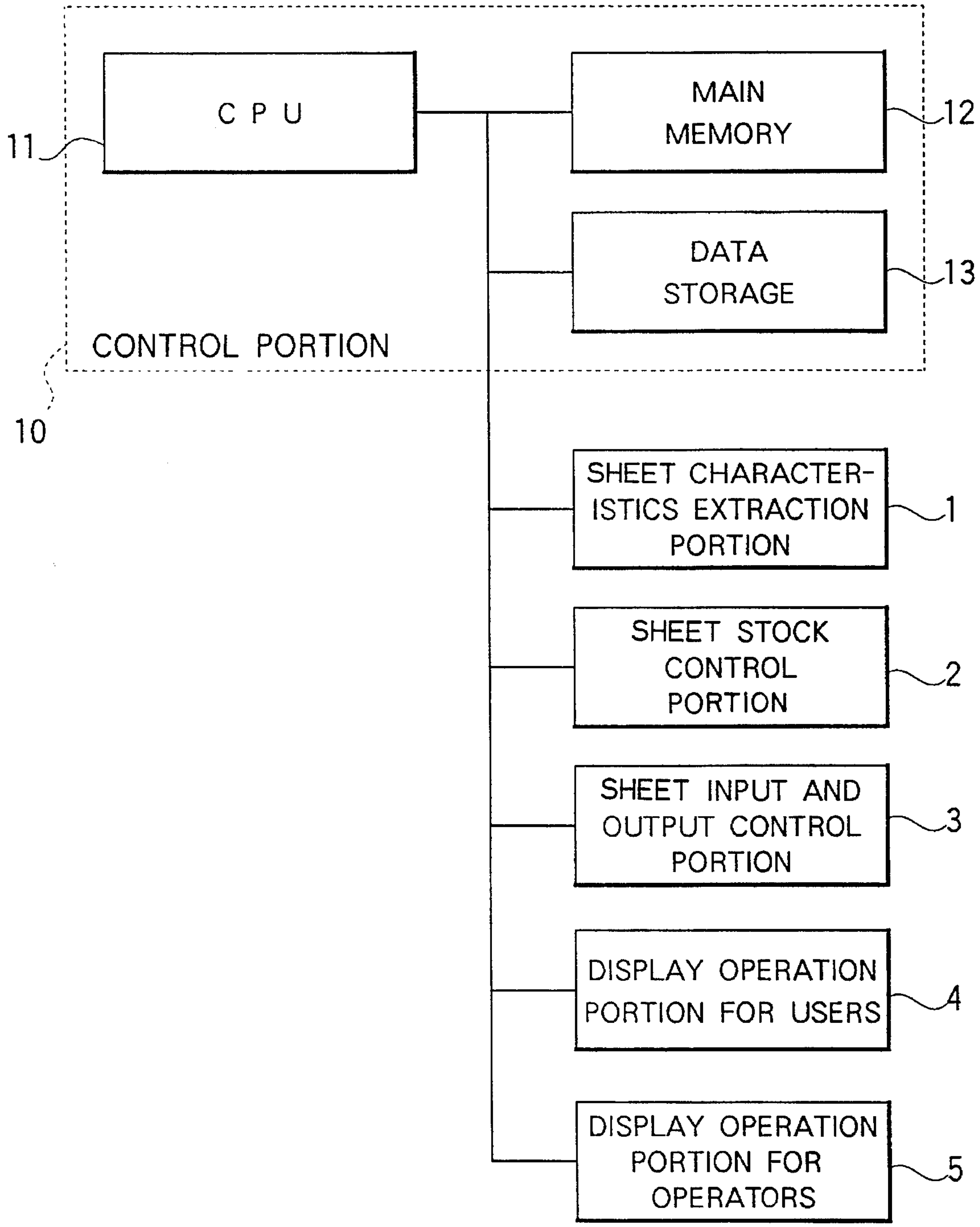
FIG. 1 is a block diagram for explaining one example of the device of the present invention.

FIG. 1 is a block diagram for explaining one example of the sheet management device according to the present invention. This device comprises a sheet characteristics extraction portion 1 for recognizing characteristics of sheets such as paper-moneys, a sheet stock control portion 2 for controlling the mechanism of carrying and stocking sheets, a sheet input and output control portion 3 for controlling the mechanism of taking sheets into the device or discharging sheets from the device, a display operation portion for users 4 which is an information transmission unit for displaying information to users from the device or for users to input information into the device, a display operation portion for operators 5 which is an information transmission unit for displaying information to users from the device or for operators to input information into the device, and a control portion 10 for carrying out an overall control to each control portion. The control portion 10 comprises a CPU 11, a main memory 12 and a data storage 13 for storing data.

Figure 2:
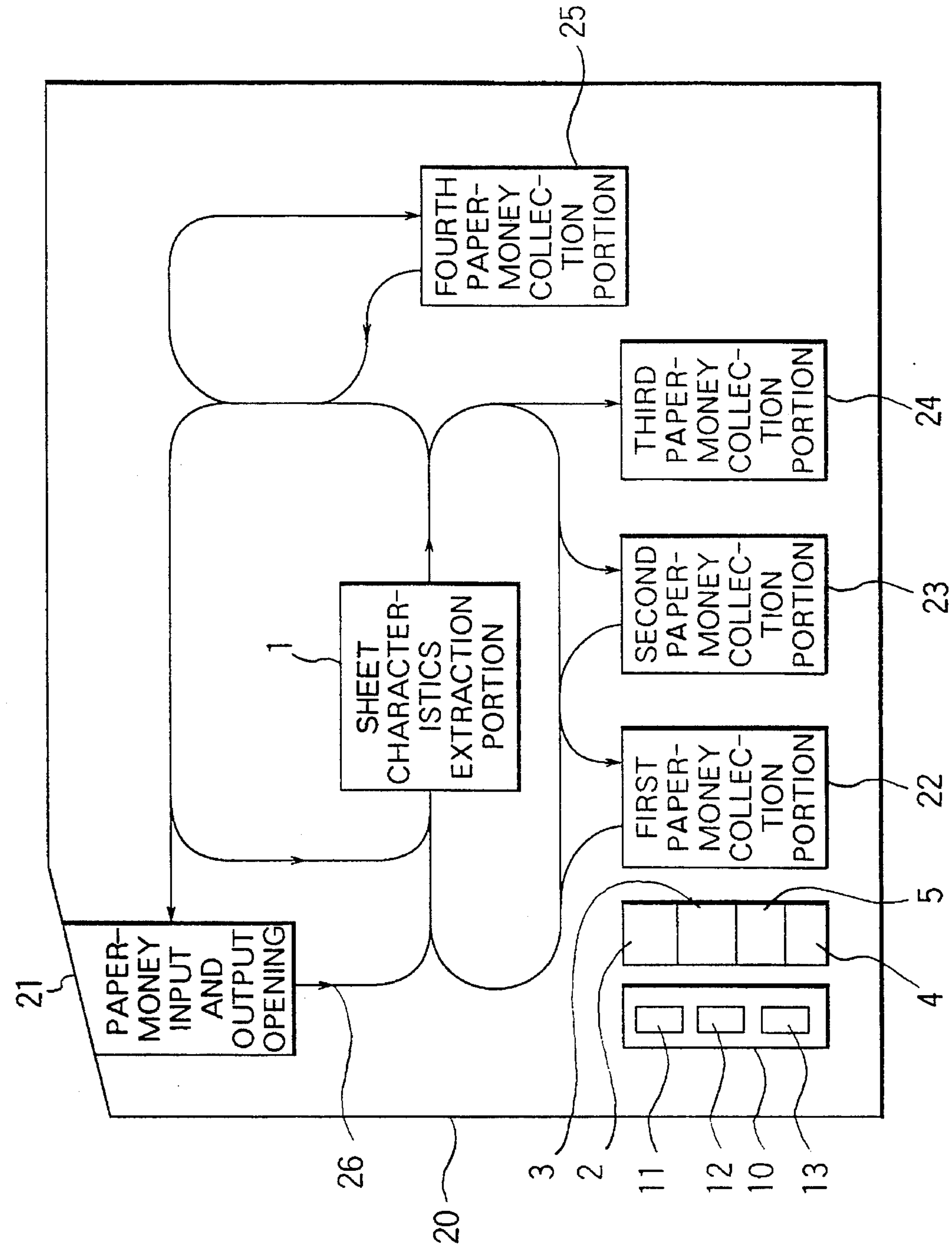
FIG. 2 is a diagram showing one embodiment of a paper-money processing portion of an automated teller machine having the device shown in FIG. 1.

FIG. 2 shows one embodiment of the paper-money processing portion in the automated teller machine having the device shown in FIG. 1. An automated teller machine 20 comprises a paper-money input and output opening 21 for users to put paper-moneys into the machine or take out paper-moneys from the machine, a first paper-money collection portion 22 and a second paper-money collection portion 23 for collecting paper-moneys taken into the machine for different purposes, a third paper-money collection portion 24 for accommodating paper-moneys that can not be discharged from the machine, a fourth paper-money collection portion 25 for loading paper-moneys to the machine, and a paper-money carrying portion 26 for carrying paper-moneys to each portion. The sheet characteristics extraction portion 1 for reading the characteristics of paper-moneys is disposed at a predetermined position of the paper-money carrying portion 26. Next, description will be made of one example of the paper-money management operation in the automated teller machine shown in FIG. 2.

Figure 3:
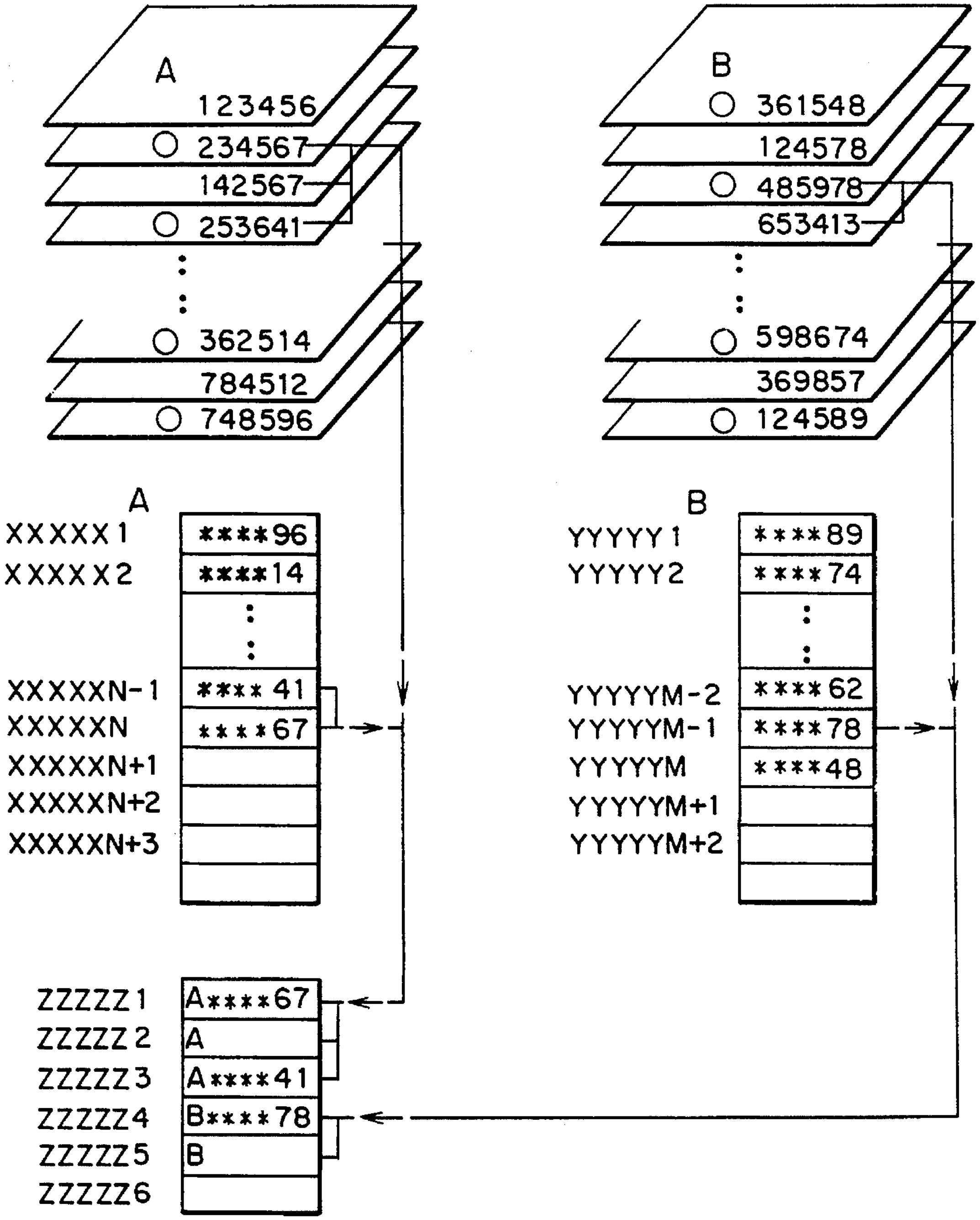
FIG. 3 is a control conceptional diagram showing a system for storing parts of letters or symbols representing characteristics of paper-moneys for each preset number of paper-moneys, as one example of the operation of the automated teller machine of the present invention.

FIG. 3 is a conceptional diagram showing one example of the paper-money management operation in the automated teller machine shown in FIG. 2. Paper-money numbers and types of money are used as characteristic data of paper-moneys, and the automated teller machine stores parts of the paper-money numbers for every other sheet, storing data of paper-moneys marked with circles in FIG. 3. FIG. 3 illustrates the case that the characteristics extraction portion 1 reads paper-money numbers of paper-moneys A and B, reading the lower two digits of the numbers as parts of the data for each paper-money and storing these two-digit numbers in the data storage 13. Each of the paper-money collection portions 22, 23, 24 and 25 of the automated teller machine 20 collects paper-moneys from the bottom up in the collection portion in the order of accommodating paper-moneys and discharges paper-moneys starting from the top of the paper-moneys accommodated in the collection portion. Read data of the paper-moneys A and B are stored in respective memories in the order these paper-moneys are accommodated in the collection portions. When data of a certain paper-money can not be read, the paper-money of which data can not be read is specified based on data of the paper-money which can be read next, and the paper-money data of the unreadable paper-money which was previously stored in the data storage 13 is stored in the data area of undischargeable paper-moneys.

Figure 4:
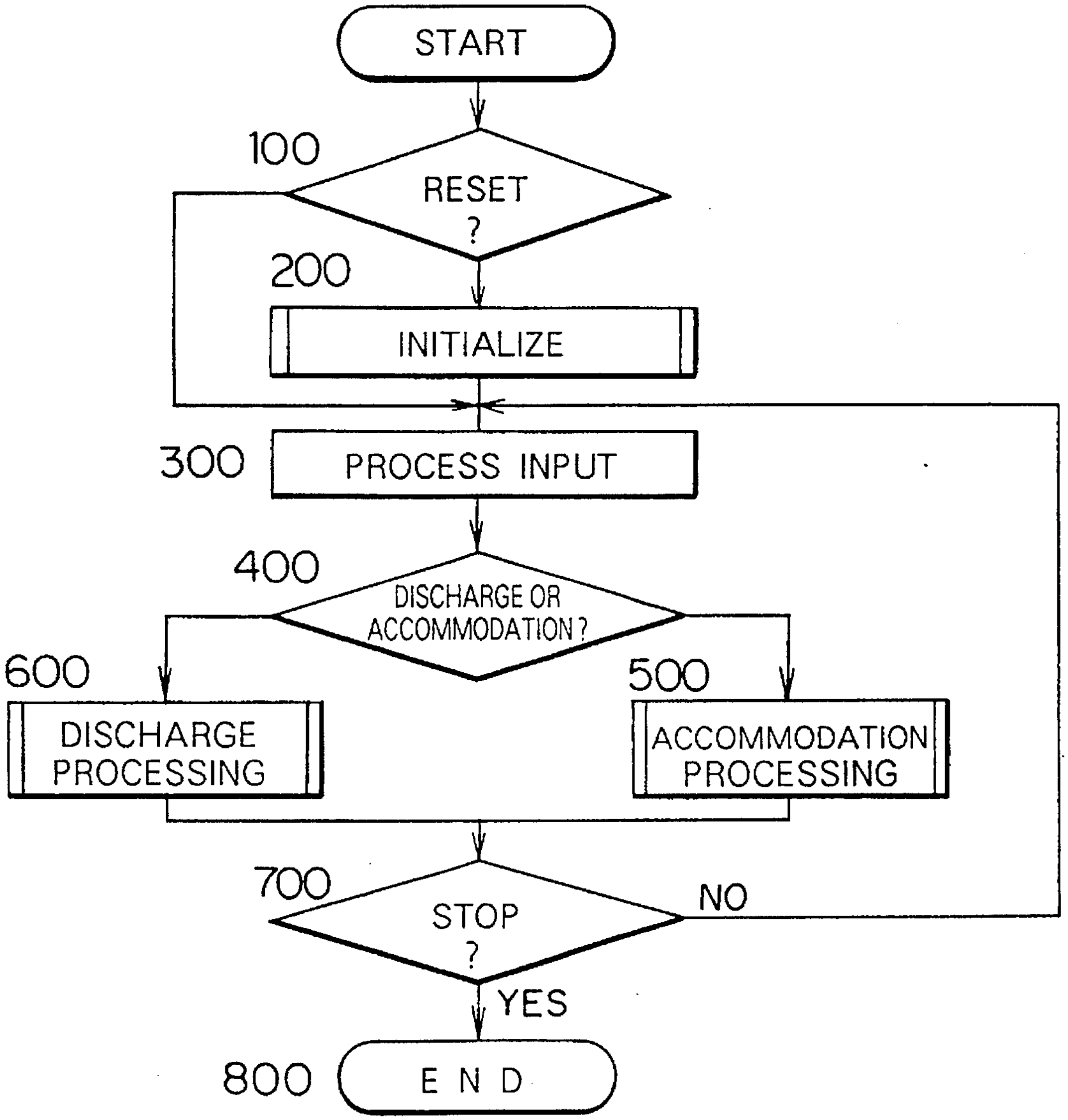
FIG. 4 is a diagram showing an overall control flow of the management control system for paper-moneys according to the present invention.

FIG. 4 shows an overall control flow for realizing the control concept of the paper-money management shown in FIG. 3.

Figure 5:
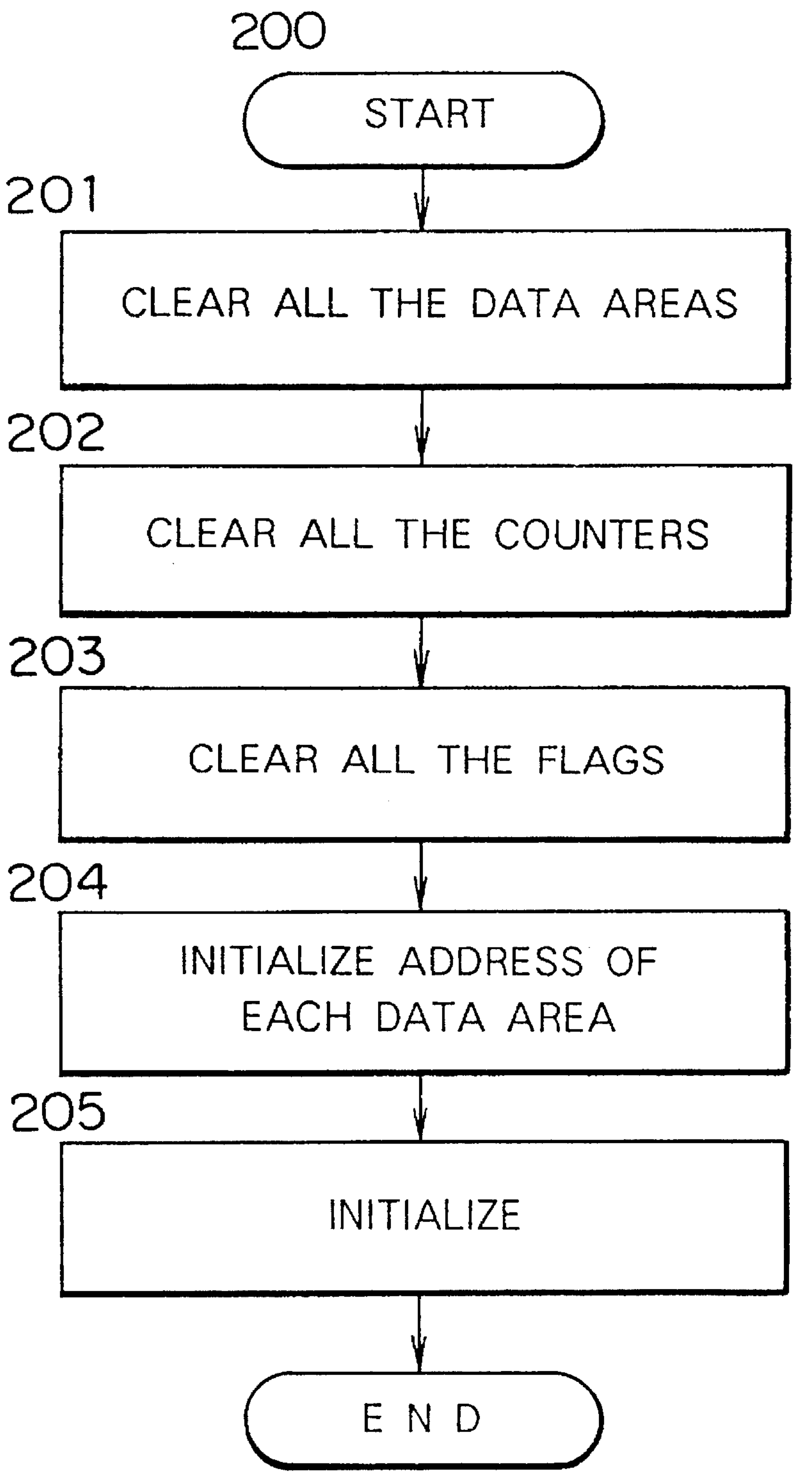
FIG. 5 is a diagram showing a detailed flow of an initialization processing routine of the overall control flow in FIG. 4.
Figure 6:
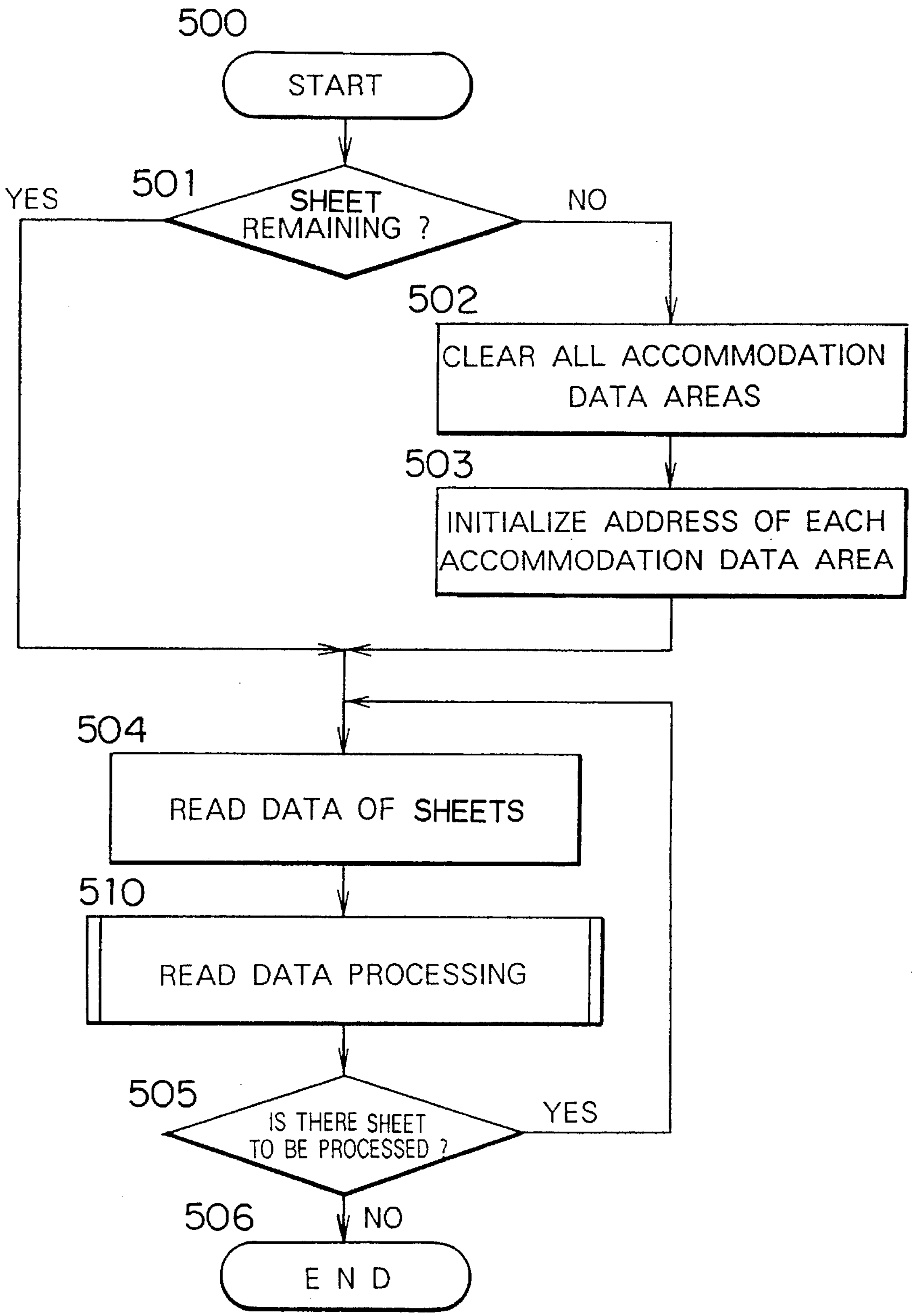
FIG. 6 is a diagram showing a detailed flow of the paper-money accommodation processing routine in FIG. 4.
Figure 7:
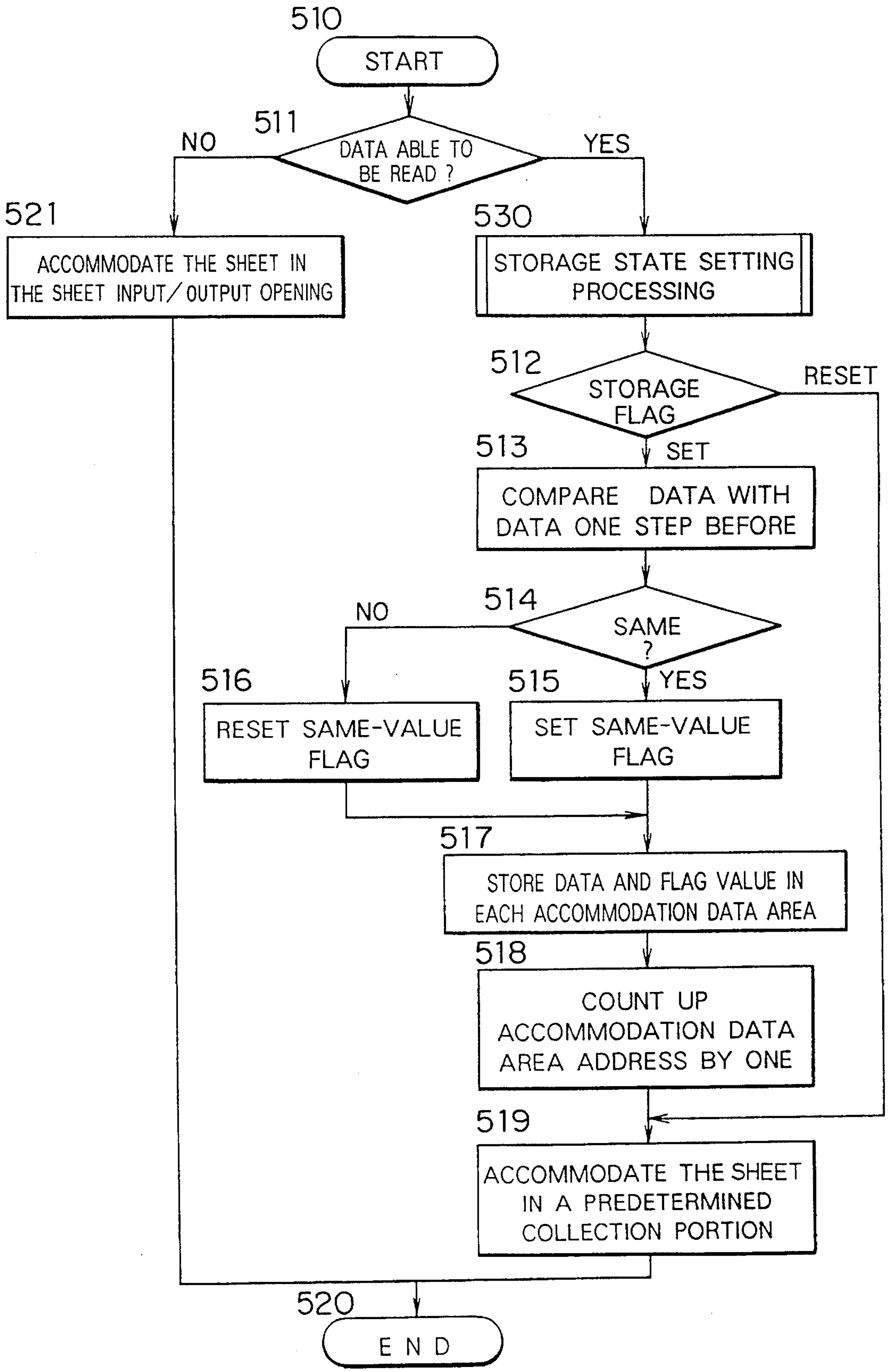
FIG. 7 is a diagram showing a detailed flow of the read data processing routine in FIG. 6.
Figure 8:
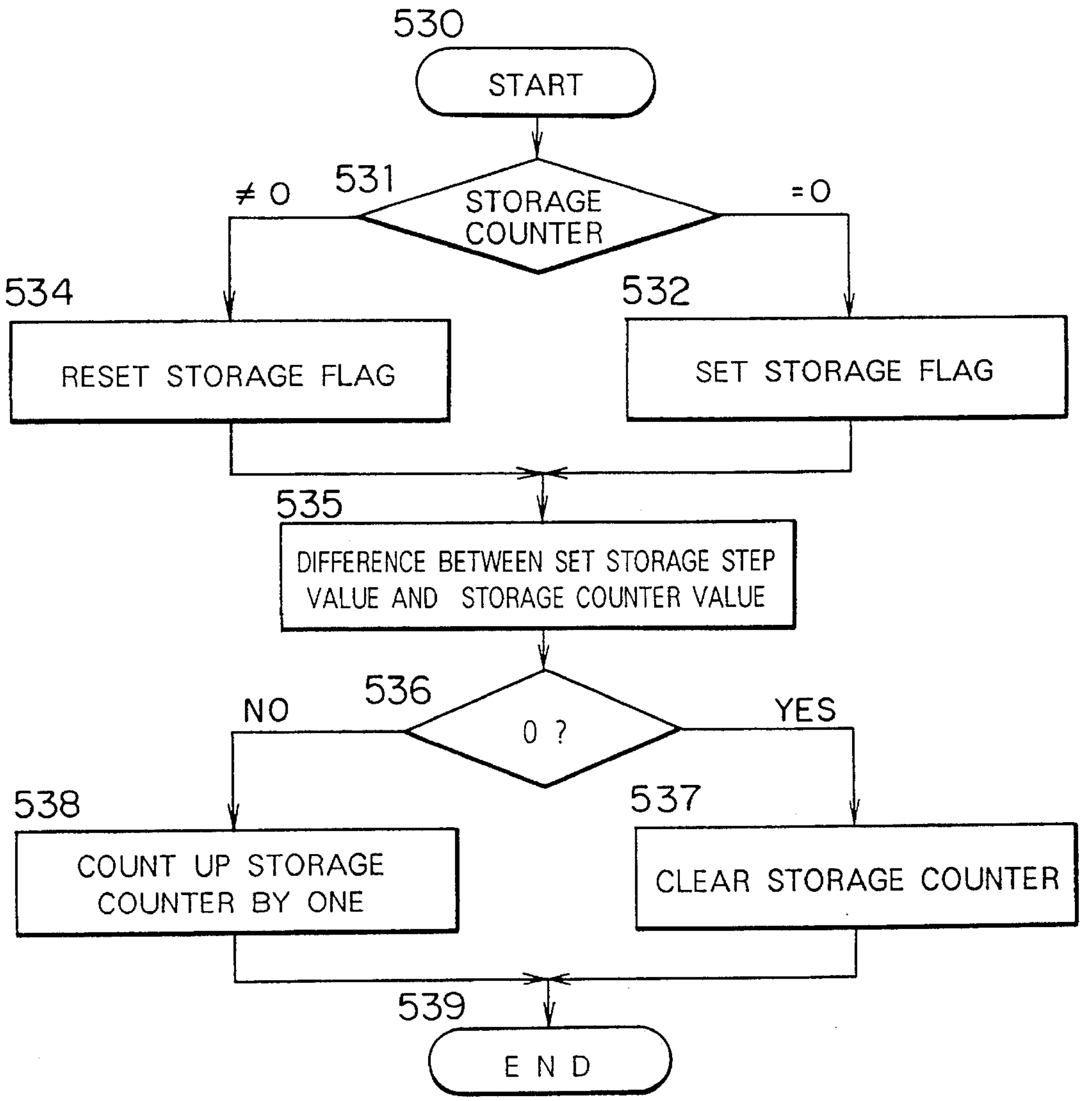
FIG. 8 is a diagram showing a detailed flow of the store state setting processing routine in FIG. 7.
Figure 9:
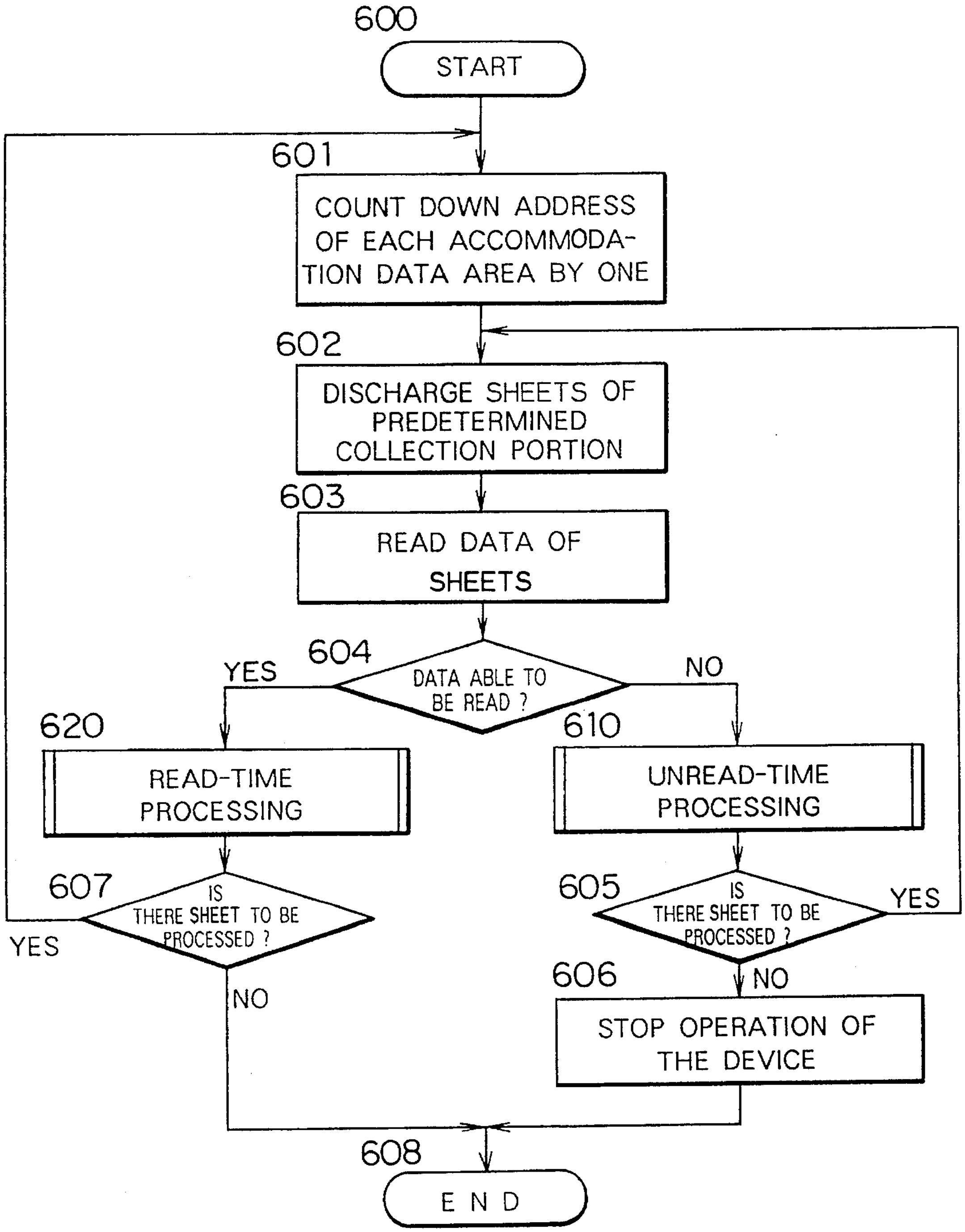
FIG. 9 is a diagram showing a detailed flow of the discharge processing routine in FIG. 4.
Figure 10:
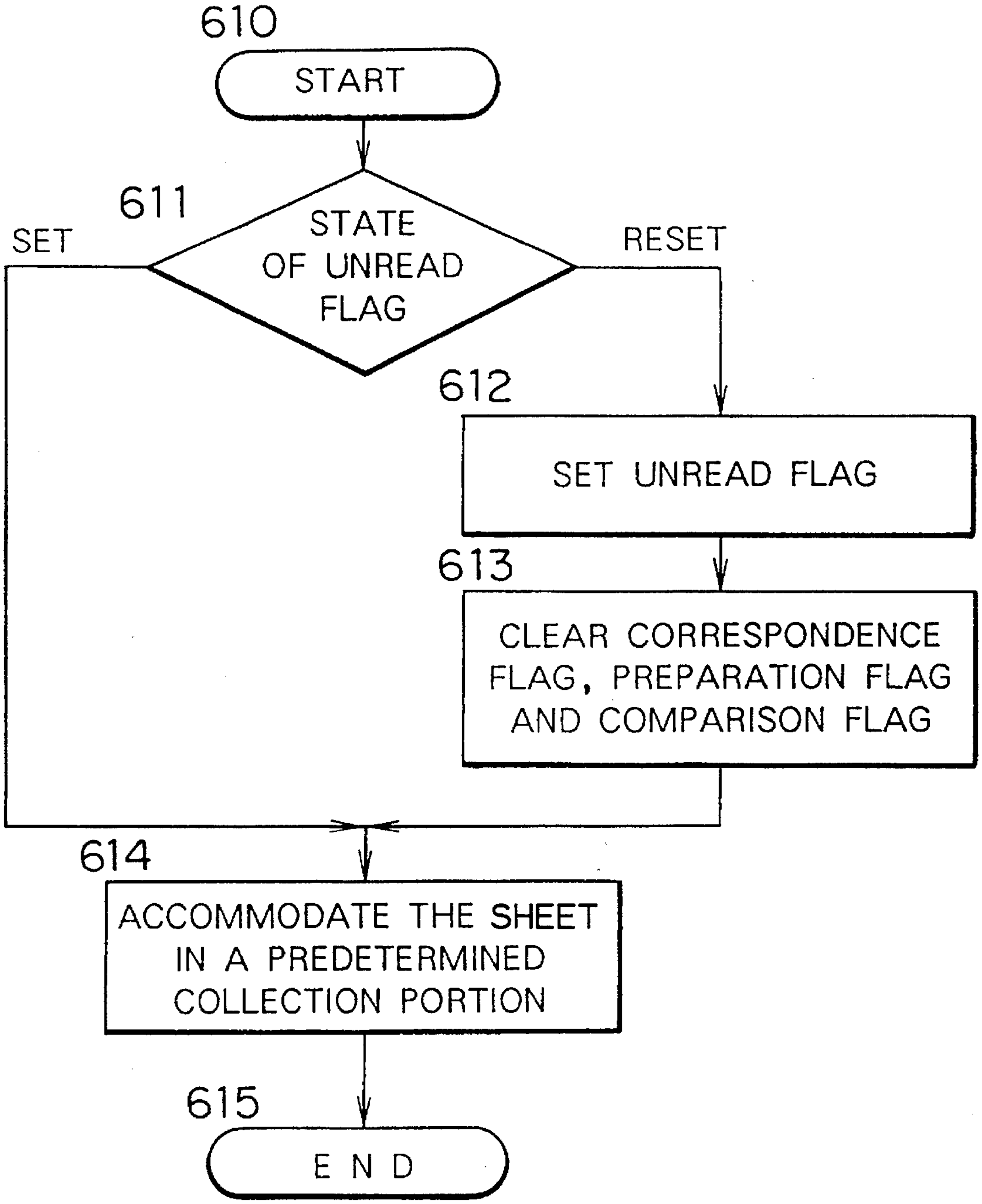
FIG. 10 is a diagram showing a detailed flow of the unread-time processing routine in FIG. 9.
Figure 11:
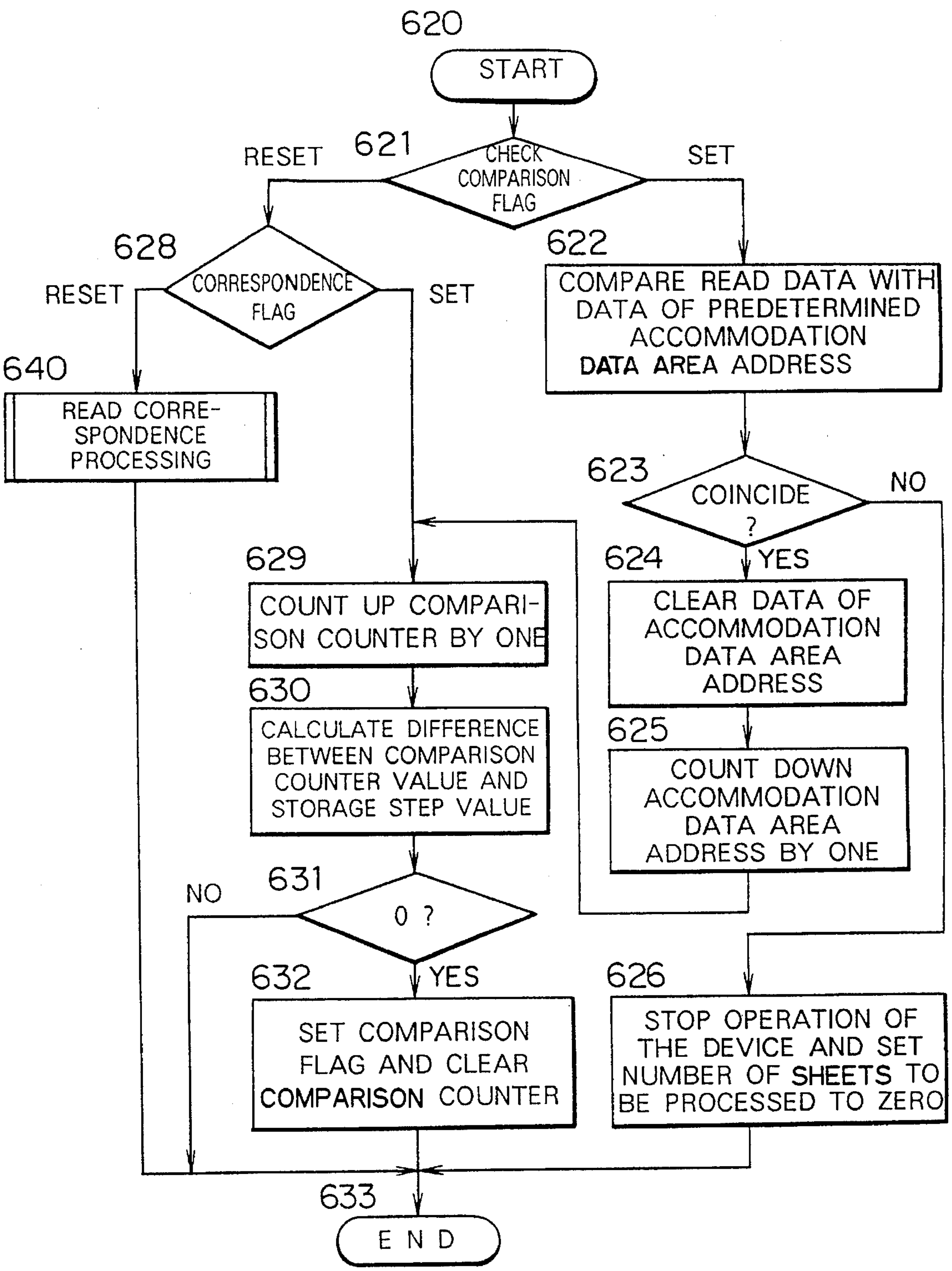
FIG. 11 is a diagram showing a detailed flow of the read-time processing routine in FIG. 9.
Figure 12:
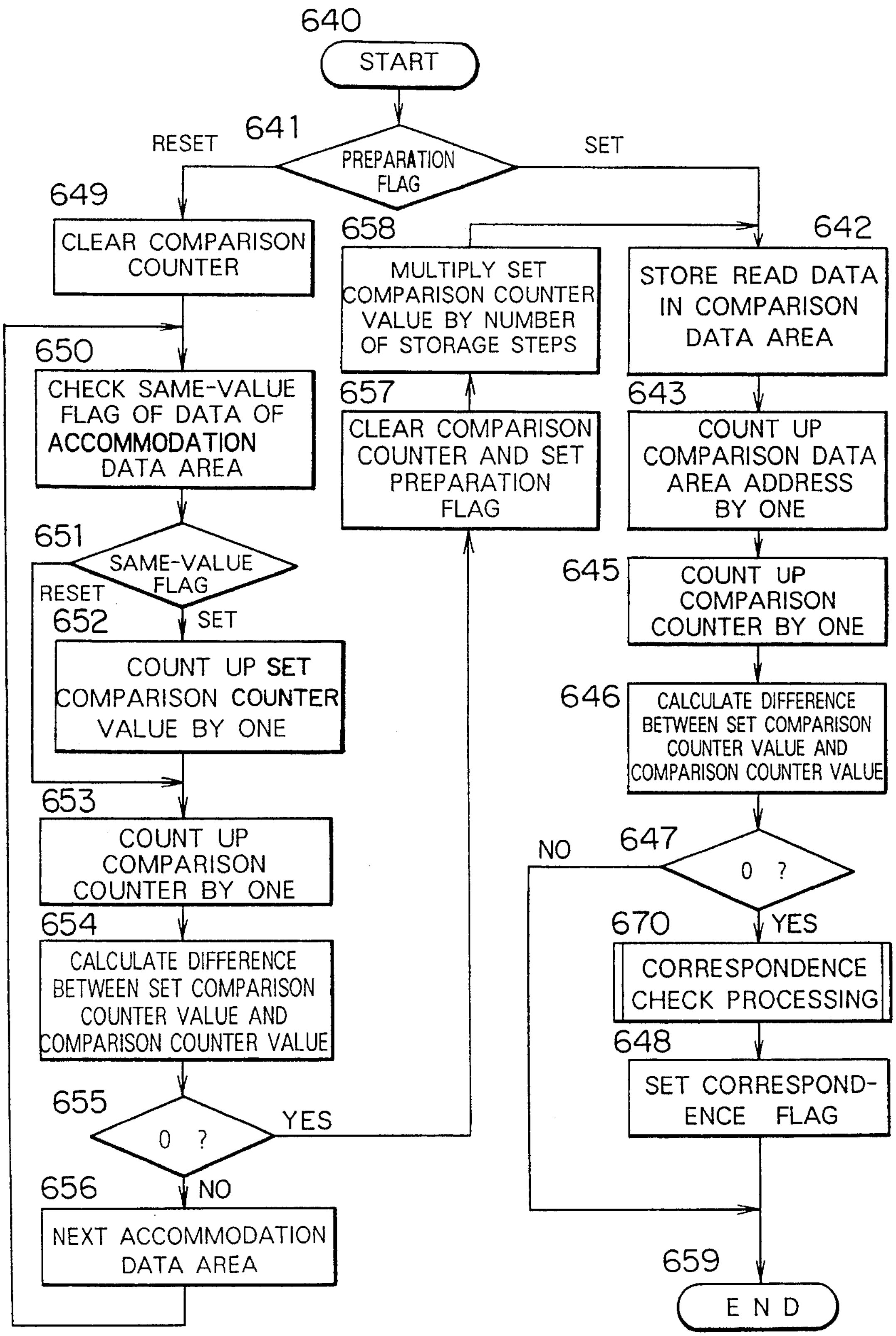
FIG. 12 is a diagram showing a detailed flow of the read correspondence processing routine in FIG. 11.
Figure 13:
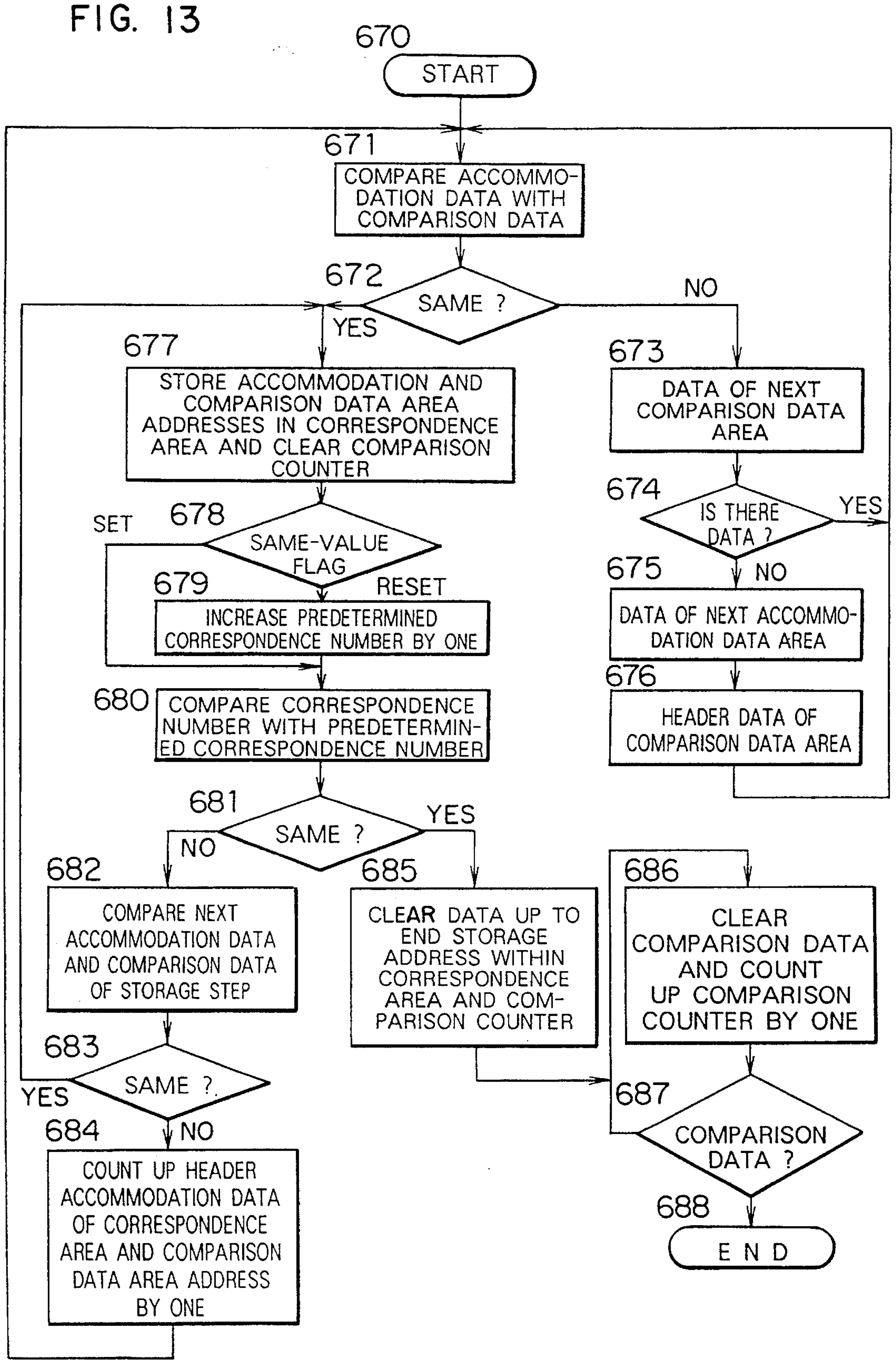
FIG. 13 is a diagram showing a detailed flow of the correspondence check processing routine in FIG. 12.

FIG. 5 shows a detailed flow of the initialization processing routine (Step 200) of the overall control flow shown in FIG. 4. FIG. 6 is a detailed flow of the processing routine for accommodating paper-moneys (Step 500) shown in FIG. 4. FIG. 7 is a detailed flow of the read data processing routine (Step 510) shown in FIG. 6. FIG. 8 is a detailed flow of the processing routine for setting the storage state (step 530) shown in FIG. 7. FIG. 9 is a detailed flow of the discharge processing routine (Step 600) shown in FIG. 4. FIG. 10 is a detailed flow of the unread-time processing routine (Step 610) shown in FIG. 9. FIG. 11 is a detailed flow of the read-time processing routine (Step 620) shown in FIG. 9. FIG. 12 is a detailed flow of the processing routine for reading (Step 640) shown in FIG. 11. FIG. 13 is a detailed flow of the processing routine for checking the correspondence (Step 670) shown in FIG. 12.

Details of the operation of the device according to the present invention will be explained below.

In starting the operation of the automated teller machine 20 in FIG. 2, it is necessary to load paper-moneys into the machine. Paper-moneys to be loaded are filled in the fourth paper-money collection portion 25 by a separate device or by hand, thus setting paper-moneys in the automated teller machine 20. The paper-moneys are then sent one by one by the paper-money carrying portion 26 to the characteristics extraction portion 1, which reads characteristics of the paper-moneys. All the data that have been read are stored in the data storage portion 13, and paper-moneys of which data have not been able to be read are temporarily stored in the paper-money input and output opening 21 and are then accommodated in the fourth paper-money collection portion 25 again upon finishing the loading of the paper-moneys from the fourth paper-money collection portion 25. By the above operation, the automated teller machine 20 can handle only paper-moneys of which data have been able to be read when they were loaded. Next, description will be made of the case when a user inputs paper-moneys into the automated teller machine. Paper-moneys that have been inputted by the user into the paper-money input and output opening 21 are sent one by one by the paper-money carrying unit 26 to the characteristics extraction portion 1, which reads characteristics of the paper-moneys. Paper-moneys of which data have not been able to be read by the characteristics extraction portion 1 are returned to the user from the paper-money input and output opening 21, and only the paper-moneys of which data have been able to be read are taken into the automated teller machine 20. Paper-moneys that have been taken into the automated teller machine 20 are collected in the first paper-money collection portion 22 and the second paper-money collection portion 23 based on the paper-money data that have been read by the characteristics extraction portion 1, and the read data are stored in the data storage portion 13. Description will now be made of the case when a user takes out paper-moneys from the automated teller machine. The first paper-money collection portion 22 and the second paper-money collection portion 23 discharge paper-moneys of necessary numbers in accordance with the amount of money that has been inputted by the user into the display operation portion for the users 4. The characteristics extraction portion 1 reads characteristics data of paper-moneys, compares these data with the data stored in the data storage portion 13, and sends paper-moneys of which data coincide with the stored data to the paper-money input and output opening 21 so that these paper-moneys are paid to the user. Paper-moneys of which data have not been able to be read are accommodated in the third paper-money collection portion 24, and the paper-moneys of which data have not been able to be read are specified based on the data that have been able to be read and the data stored in the data storage portion 13. Then, data of these specified paper-moneys are stored in the data storage portion 13.

In FIG. 4, when the device is started, a decision is made whether the reset processing is carried out to initialize the control portion 10 or not (Step 100). When the reset processing is to be carried out, the process goes to Step 200 and when the reset processing is not to be carried out, the process goes to Step 300.

In Step 200, the data storage portion 13 provided in the control unit 10 is initialized in accordance with the detailed flow shown in FIG. 5. Referring to FIG. 5, all of the data areas, each for storing data for showing characteristics of paper-moneys to be taken into the automated teller machine, are cleared in Step 201. In Step 202, all of the counters are cleared, and in Step 203 all of the flags are cleared. In Step 204, addresses of all the data areas are initialized, and in Step 205 each initial value is set. Then, the process proceeds to Step 300.

In Step 300, a type of processing required to be done at the display operation portion for users 4 or at the display operation portion for the operator 5, such as inputting, outputting, loading or recovery of paper-moneys, is selected. These operations can be divided into an accommodation processing for taking paper-moneys into the automated teller machine and a discharge processing for discharging paper-moneys from the machine.

In Step 400, a decision is made about the input processing carried out in Step 300. When an accommodation processing is selected, the process goes to Step 500, and when a discharge processing is selected the process goes to Step 600. After finishing any one of the processings selected, the process goes to Step 700. In Step 700, a decision is made about the operation or stop of the machine. When the automated teller machine is selected to be operated, the process goes back to Step 300 and when the operation of the machine is to be stopped, the process goes to Step 800 to stop the operation of the machine.

In Step 500, the accommodation processing of paper-moneys is carried out in accordance with the detailed flow shown in FIG. 6. In Step 501, a decision is made about presence or absence of paper-moneys remaining in each of the paper-money collection portions 22 and 23 which accommodate paper-moneys and store them for discharging. A known device utilizing an optical sensor (not shown) is used to detect presence or absence of paper-moneys, and a detected signal is taken from the sheet storage control portion 2. When there is no paper-money remaining in each of the paper-money collection portions, the process goes to Step 502, and when there are paper-moneys remaining in each of the paper-money collection portions, the process goes to Step 504. The accommodation processing in the case when there is no remaining paper-money means the above-described loading processing of paper-moneys. In Step 502, all the accommodation data areas are cleared, and in Step 503 addresses of all the accommodation data areas are initialized. In Step 504, data showing characteristics of paper-moneys are read by the paper-money characteristics extraction portion 1. A known device utilizing a line sensor (not shown) can be used as a reading unit for the paper-money characteristics extraction portion 1. In Step 510, data that have been read are processed as shown in FIG. 7. In Step 505, a decision is made whether there are paper-moneys to be processed. If there are paper-moneys to be processed, the process goes to Step 504, and if there is no paper-money to be processed, the process goes to Step 506.

In Step 510, data that have been read are processed in accordance with the detailed flow shown in FIG. 7. In Step 511, a decision is made about the state of reading the characteristic data of paper-moneys. When characteristic data of paper-moneys have been able to be read, the process goes to Step 530, and when characteristic data have not been able to be read, the process goes to Step 521. In Step 530, a storage state of characteristic data of paper-moneys that have been read is set in accordance with the detailed flow shown in FIG. 8. In Step 512, a decision is made whether a storage flag is set or not. When the flag is set, the process goes to Step 512, and when the flag is reset, the process goes to Step 519. In Step 513, data is compared with the data one step before. In Step 514, a decision is made whether data coincide with the data one step before. When both data coincide, the process goes to Step 515 and a same-value flag is set, and then the process goes to Step 517. When both data do not coincide, the process goes to Step 516, and a same-value flag is reset, and then the process goes to Step 517. In Step 517, data and flag values are stored in each accommodation data area. In Step 518, the accommodation data area address is counted up by one. In Step 519, paper-moneys are accommodated in a predetermined collection portion, and the process goes to Step 520. In Step 521, paper-moneys are accommodated in a predetermined position such as the paper-money input and output opening 21 because characteristic data of the paper-moneys have not been able to be read.

In Step 530, the store state setting processing is carried out in accordance with the detailed flow shown in FIG. 8. In Step 531, a decision is made whether the value of the storage counter is zero or not. When the value of the storage counter is zero, the storage flag is set in Step 532. When the value of the storage counter is not zero, the storage flag is reset in Step 534. In Step 535, a difference between the value of the storage counter and the set storage step value is calculated, and a decision is made whether the difference is zero or not in Step 536. If the difference is zero, the process goes to Step 537, where the storage counter is cleared, and then the process goes to Step 539. If the difference is not zero, the process goes to step 538, where the storage counter is counted up by one, and then the process goes to Step 539.

In Step 600, the discharge processing is carried out in accordance with the detailed flow shown in FIG. 9. In step 601, each accommodation data area address is counted down by one. In Step 602, paper-moneys are discharged from a predetermined paper-money collection portion, and in Step 603, characteristic data of the discharged paper-moneys are read by the paper-money characteristics extraction portion 1. In Step 604, a decision is made whether the characteristic data have been able to be read. If the characteristic data have not been able to be read, the process goes to Step 610, where the unread-time processing is carried out in accordance with the detailed flow shown in FIG. 10. If the characteristic data have been able to be read, the process goes to Step 620, where the read-time processing is carried out in accordance with the detailed flow shown in FIG. 11. After the unread-time processing in Step 610, a decision is made whether there are paper-moneys to be processed in Step 605. When there are paper-moneys to be processed, the process goes to Step 602. When there is no paper-money to be processed, the process goes to Step 606. In Step 606, the operation of the automated teller machine is stopped, and the process goes to Step 608. When there are paper-moneys to be processed in Step 607 after the read-time processing in Step 620, the process goes to Step 601. When there is no paper-money to be processed in Step 607, the process goes to Step 608.

In Step 610, the unread-time processing is carried out in accordance with the detailed flow shown in FIG. 10. In Step 611, the state of the unread flag is checked. If the flag is in the reset state, the process goes to Step 612, and if the unread flag is in the set state, the process goes to Step 614. In Step 612, the unread flag is set, and in Step 613 predetermined various kinds of flags are cleared. In Step 614, the paper-money is accommodated in a predetermined paper-money collection portion, and the process goes to Step 615.

In Step 620, the read-time processing is carried out in accordance with the detailed flow shown in FIG. 11. In Step 621, the comparison flag is checked. If the comparison flag is in the set state, the process goes to Step 622, and if the comparison flag is in the reset state the process goes to step 628. In Step 622, data that has been read is compared with the data in a predetermined accommodation data area address. In Step 623, a decision is made whether these data coincide or not. When these data do not coincide, the process goes to Step 626, and when these data coincide, the process goes to Step 624. In Step 624, data of the accommodation data area address is cleared. In Step 625, the accommodation data area address is counted down by one, and then the process goes to Step 629. In Step 626, the operation of the automated teller machine is stopped and the number of paper-moneys to be processed further is set to zero. Then, the process goes to Step 633. In Step 628, the state of the correspondence flag is checked. When the correspondence flag is in the set state, the process goes to Step 629, and when the correspondence flag is in the reset state, the process goes to Step 640. In Step 629, the value of the comparison counter is counted up by one, and in Step 630 the difference between the value of the comparison counter and the storage step value is calculated. In Step 631, a decision is made whether the calculated difference is zero or not. If the difference is zero, the process goes to Step 632, where the comparison flag is set and the comparison counter is cleared, and then the process goes to Step 633. If the difference is not zero in Step 631, the process goes to Step 633. In Step 640, the read correspondence processing is carried out and the process goes to Step 633.

In Step 640, the read correspondence processing is carried out in accordance with the detailed flow shown in FIG. 12. In Step 641, the preparation flag is checked. If this flag is in the set state, the process goes to Step 642, and if this flag is in the reset state, the process goes to Step 649. In Step 649, the comparison counter is cleared, and in Step 650 the same-value flag of the data in the accommodation data area is checked. If the same-value flag is in the reset state, the process goes to Step 653, and if the same-value flag is in the set state, the process goes to Step 652, where the set comparison counter value is counted up by one. In Step 653, the comparison counter value is counted up by one, and in Step 654 the difference between the set comparison counter value and the comparison counter value is calculated. In Step 655, a decision is made whether the calculated difference is zero or not. If the difference is zero, the process goes to Step 657, and if the difference is not zero, the process goes to Step 656, where data of the next accommodation data area is called, and then the process goes to Step 650. In Step 657, the comparison counter is cleared and the preparation flag is set. In Step 658, the set comparison counter value is multiplied by the number of storage steps, and the process goes to Step 642. In Step 642, the read data is stored in the comparison data area, and in Step 643 the comparison data area address is counted up by one. In Step 645, the value of the comparison counter is counted up by one. In Step 646, the difference between the set comparison counter value and the comparison counter value is calculated, and in Step 647 the difference is checked. If the difference is not zero, the process goes to Step 659, and if the difference is zero, the process goes to Step 670, where the correspondence check is carried out. In Step 648, the correspondence flag is set and the process goes to Step 659.

In Step 670, the correspondence check is carried out in accordance with the detailed flow shown in FIG. 13. In Step 671, the accommodation data is compared with the comparison data. In Step 672, a decision is made whether the two data are the same or not. If the two data are the same, the process goes to Step 677, and if the two data are not the same the process goes to Step 673. In Step 673, data of the comparison data area is checked. In Step 674, a decision is made whether data exists or not. If there is data, the process goes to Step 671, and if there is no data, the process goes to Step 675. In Step 675, data of the next accommodation data area is called. In Step 676, header data of the comparison data area is called, and the process goes to Step 671. In Step 677, the accommodation data area address and the comparison data area address are stored in the correspondence area, and the comparison counter is cleared. In Step 678, the state of the same-value flag is checked. If the flag is in the set state, the process goes to Step 680, and if the flag is in the reset state, a predetermined correspondence number is increased by one in Step 679 and the process goes to Step 680. In Step 680, the correspondence number is compared with a predetermined correspondence number. In Step 681, a decision is made whether the correspondence number coincides with the predetermined correspondence number. If the two numbers are the same, the process goes to Step 685, and if the two numbers are not the same, the process goes to Step 682. In Step 682, the accommodation data is compared with the comparison data of the storage step. If the two data are the same, the process goes to step 677, and if the two data are not the same, the process goes to Step 684. In Step 684, the header accommodation data of the correspondence area and the comparison data area address are counted up by one, and the process goes to Step 677. In Step 685, data up to the end storage address within the correspondence area and the comparison counter are cleared. In Step 686, the comparison data is cleared and the value of the comparison counter is counted up by one. In Step 687, a decision is made whether there is comparison data or not. If there is comparison data, the process goes to Step 686, and if there is no comparison data, the process goes to Step 688.

As described above, according to the present invention, it is possible to specify any one of all the paper-moneys in the automated teller machine based on information of paper-moneys stored before and after a corresponding sheet of paper-money, said information being a part of a letter or a symbol showing characteristics of each paper-money stored for every set number of paper-moneys. Therefore, it is possible to manage automatically in real time the amount of various kinds of paper-moneys taken into the machine, the amount of various kinds of paper-moneys discharged from the machine and the stock level of paper-moneys within the machine including the amount of undischargeable paper-moneys.

Figure 14:
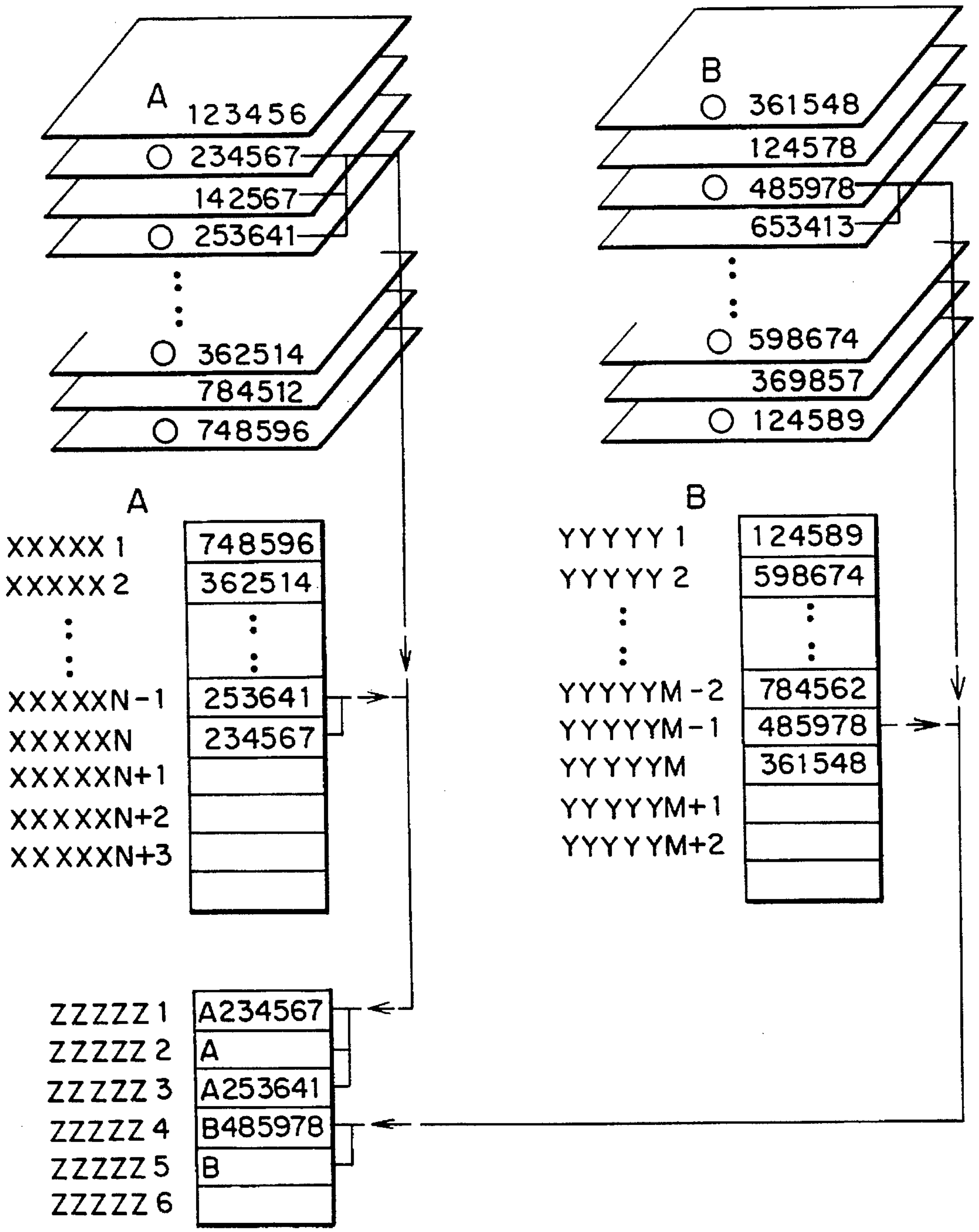
FIG. 14 is a control conceptional diagram showing a system for storing all the letters or symbols representing characteristics of paper-moneys for each preset number of paper-moneys as another example of the operation of the automated teller machine of the present invention.
Figure 15:
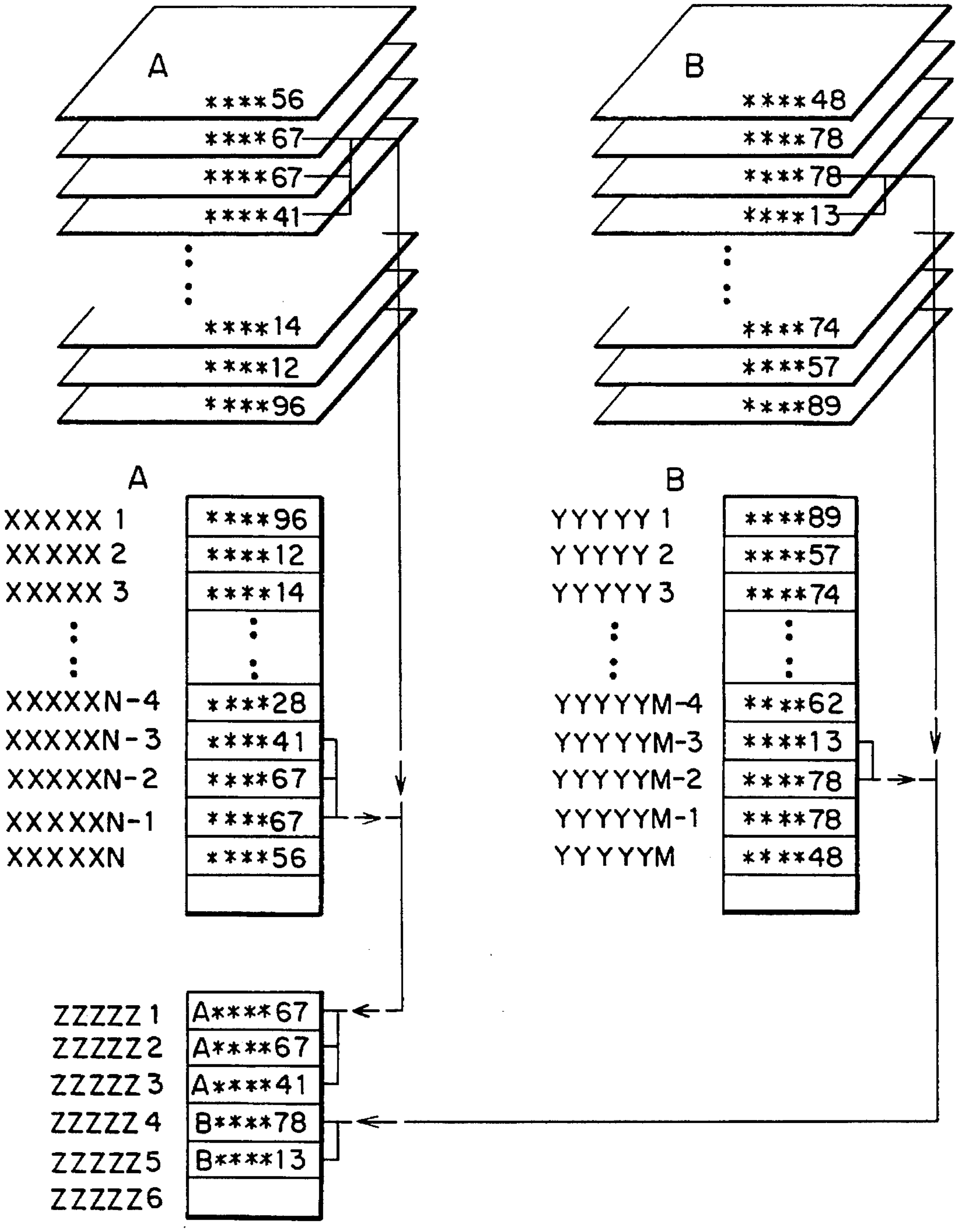
FIG. 15 is a control conceptional diagram showing the system for storing parts of letters or symbols representing characteristics of paper-moneys for all the paper-moneys as still another example of the operation of the automated teller machine of the present invention.
Figure 16:
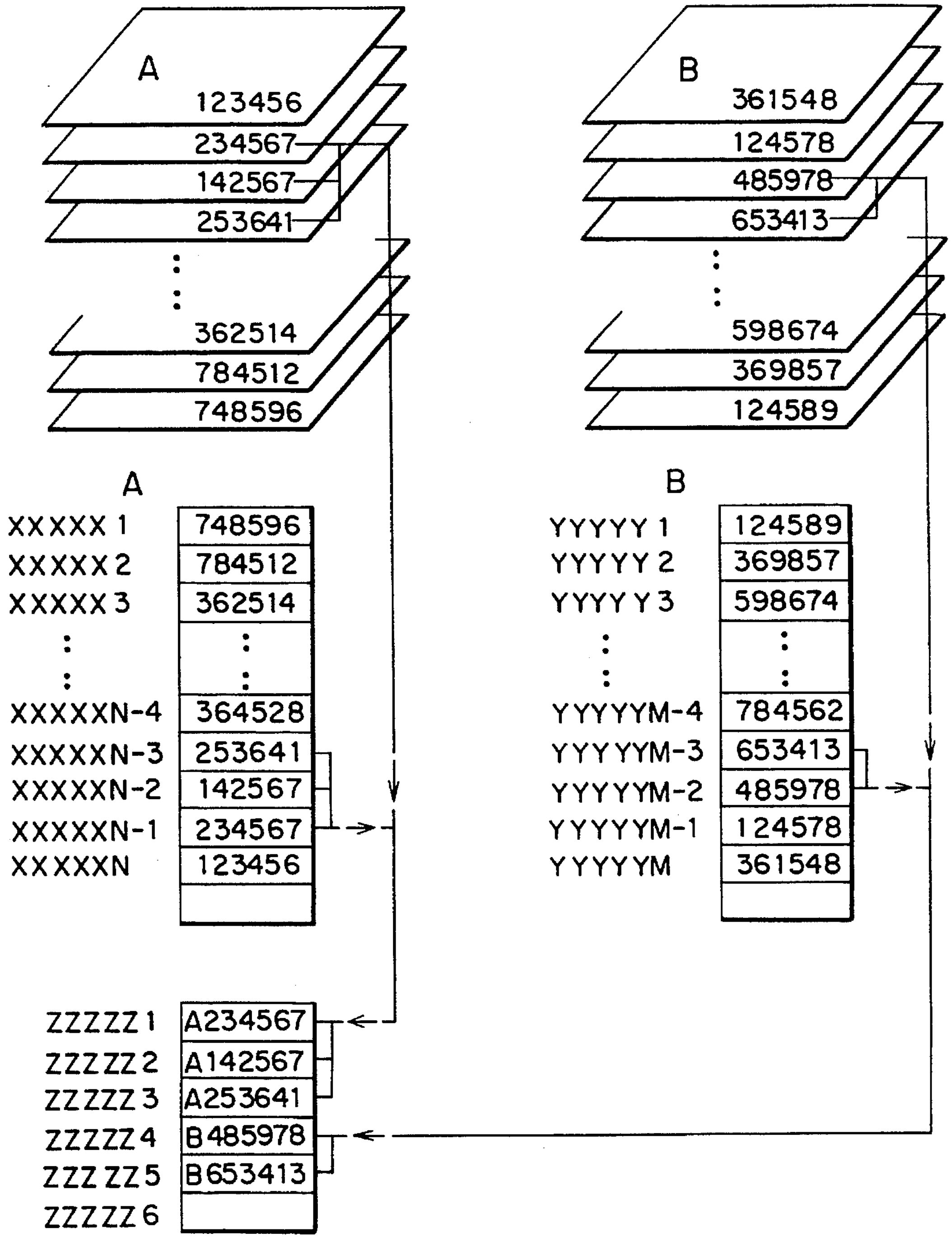
FIG. 16 is a control conceptional diagram showing the system for storing all the letters or symbols representing characteristics of paper-moneys for all the paper-moneys as still another example of the operation of the automated teller machine of the present invention.

Other control conceptional diagrams showing paper-money control concepts to which the above-described control system can be applied will be explained below. FIG. 14 shows a system for storing all the letters or symbols representing characteristics of paper-moneys for every set number of paper-moneys, e.g. for every other sheet of paper-money as shown in FIG. 14. In this case, letters or symbols can be specified for each sheet of paper-moneys. Therefore, the same-value flag used in the above control flow is not necessary. FIG. 15 shows a system for storing a part of a letter or a symbol representing characteristics of paper-moneys for all the paper-moneys. In this case, only one sheet of paper-money is set to be stored in the above control flow. FIG. 16 shows a system for storing all the letters or symbols representing characteristics of paper-moneys for all the paper-moneys. In this case, it is possible to specify all the paper-moneys. Therefore, this system can be realized by utilizing only the unread flag in the above control flow.

As described above, the above control system can be applied to any one of the above-described control concepts, and it is also possible to manage automatically in real time the amount of various kinds of paper-moneys taken into the automated teller machine, the amount of various kinds of paper-moneys discharged from the machine and the stock level of paper-moneys within the machine including the amount of undischargeable paper-moneys.

Figure 17:
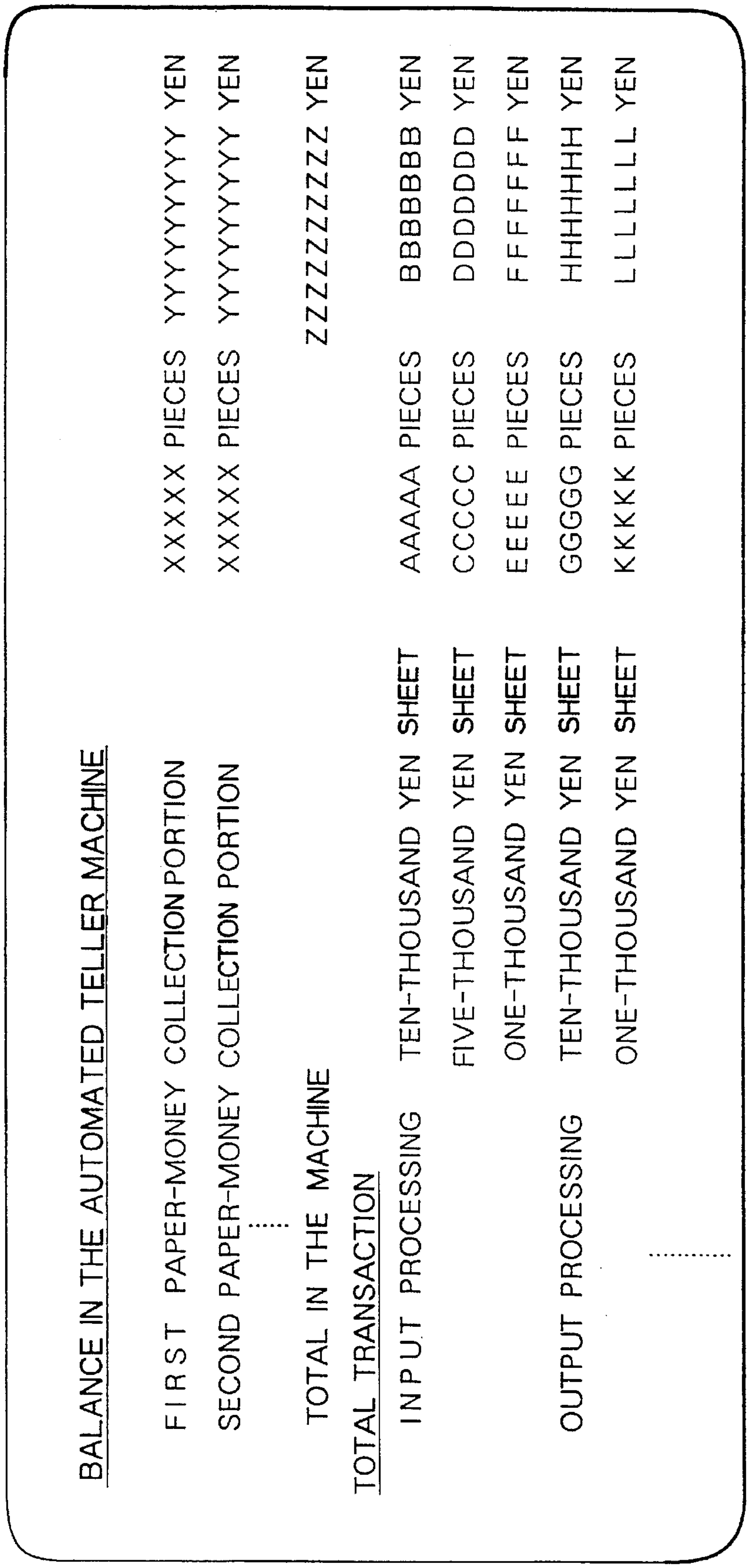
FIG. 17 is a diagram showing one example of the display screen for the display operation portion for an operator according to the present invention.

Further, since it is possible to manage the amount of paper-moneys automatically and in real time, it is possible to display the result of the management showing the amounts as illustrated in FIG. 17 in the display operation portion for the operator 5. It is also possible to transfer the screen display content to a remote monitoring unit (not shown), thus making it possible to carry out an integrated management.

Although the present embodiments have been explained for application to paper-moneys in the automated teller machine, the present embodiments can also be applied to sheets such as check sheets or lottery sheets which carry identifiable information. Since these sheets can be managed while carrying out various processings, no manpower or time is required for the management, making it possible to carry out an integrated management of information of all the relevant devices.

According to the present invention, it is possible to store and manage data representing characteristics of each sheet of paper-moneys within the machine, so that paper-moneys within the machine can be managed completely.

Further, since it is possible to read and manage characteristics of paper-moneys while processing the paper-moneys, it is possible to eliminate manpower and time for the management.

Further, the present control system can also be applied to sheets other than paper-moneys which have letters or symbols for specifying each sheet, making it possible to manage these sheets in the similar manner.

We claim:

1. A sheet management device comprising:

a plurality of sheet collecting means for collecting a plurality of different kinds of sheets;

means for reading characteristics of said plurality of different kinds of sheets, wherein said reading means reads numbers on said plurality of different kinds of sheets as said characteristics;

means for specifying parts of said read characteristics that are to be stored;

means for specifying sheets for which said specified parts of said read characteristics are to be stored;

means for storing said specified parts of said read characteristics for said specified sheets in correspondence to said plurality of sheet collecting means;

means for returning sheets for which said characteristics could not be read at a time of taking in sheets;

means for managing stock levels of sheets in said plurality of sheet collecting means;

means for displaying quantities and denominations of sheets that have been processed by the device and by each of said plurality of sheet collecting means; and means for controlling each of said means.

2. A sheet management device comprising:

a plurality of sheet collecting means for collecting a plurality of different kinds of sheets;

means for reading characteristics of said plurality of different kinds of sheets, wherein said reading means reads numbers on said plurality of different kinds of sheets as said characteristics;

means for specifying parts of said read characteristics that are to be stored;

means for specifying sheets for which said specified parts of said read characteristics are to be stored;

means for storing said specified parts of said read characteristics for said specified sheets in correspondence to said plurality of sheet collecting means;

means for specifying sheets for which said characteristics could not be read at a time of discharging sheets;

means for managing stock levels of sheets in said plurality of sheet collecting means;

means for displaying quantities and denominations of sheets that have been processed by the device and by each of said plurality of sheet collecting means; and means for controlling each of said means.

3. A sheet management device comprising:

a plurality of sheet collecting means for collecting a plurality of different kinds of sheets;

means for reading characteristics of said plurality of different kinds of sheets, wherein said reading means reads numbers on said plurality of different kinds of sheets as said characteristics;

means for specifying parts of said read characteristics that are to be stored;

means for specifying sheets for which said specified parts of said read characteristics are to be stored;

means for storing said specified parts of said read characteristics for said specified sheets in correspondence to said plurality of sheet collecting means;

means for returning sheets for which said characteristics could not be read at a time of taking in sheets;

means for specifying sheets for which said characteristics could not be read at a time of discharging sheets;

means for storing said sheets for which said characteristics could not be read at a time of discharging sheets;

means for managing stock levels of sheets in said plurality of sheet collecting means;

means for displaying quantities and denominations of sheets that have been processed by the device and by each of said plurality of sheet collecting means; and means for controlling each of said means.

4. An automated teller machine comprising:

a plurality of paper-money collecting means for collecting a plurality of different kinds of paper-money;

means for reading characteristics of said plurality of different kinds of paper-money at a time of taking paper-money into said machine via a paper-money input and output opening and at a time of discharging paper-money from said machine via said paper-money input and output opening, wherein said reading means reads numbers on said plurality of different kinds of paper-money as said characteristics;

means for specifying parts of said read characteristics that are to be stored;

means for specifying paper-money for which said specified parts of said read characteristics are to be stored;

means for storing said specified parts of said read characteristics for said specified paper-money in correspondence to said plurality of paper-money collecting means;

means for temporarily storing paper-money for which said characteristics could not be read at a time of taking paper-money into said machine;

means for returning paper-money that has been stored in said temporary storing means to said paper-money input and output opening;

means for specifying paper-money for which said characteristics could not be read at a time of discharging paper-money from said machine;

means for storing said paper-money for which said characteristics could not be read at a time of discharging paper-money from said machine;

means for managing stock levels of paper-money in said plurality of paper-money collecting means;

means for displaying quantities and denominations of paper-money that has been processed by the machine and by each of said plurality of paper-money collecting means; and means for controlling each of said means.

5. An automated teller machine comprising:

a paper-money input and output opening via which paper-money is taken into said machine and via which paper-money is discharged from said machine;

at least one paper-money collecting means for collecting at least one kind of paper-money that has been taken into said machine;

means for storing paper-money that cannot be discharged from said machine;

means for carrying paper-money to said at least one paper-money collecting means said paper-money storing means, and said paper-money input and output opening, said carrying means including, at a predetermined position, means for reading at least one characteristic of paper-money at a time of taking paper-money into said machine and at a time of discharging paper-money from said machine;

means for storing said at least one characteristic that has been read by said reading means in correspondence to said at least one paper-money collecting means;

means for taking paper-money into said machine at a time of taking paper-money into said machine and discharging paper-money from said machine at a time of discharging paper-money from said machine if said at least one characteristic is readable by said reading means, and for returning paper-money to said paper-money input and output opening at a time of taking paper-money into said machine and storing paper-money in said paper-money storing means at a time of discharging paper-money from said machine if said at least one characteristic is unreadable by said reading means;

means for managing at least one stock level of paper-money in said at least one paper-money collecting means; and means for controlling each of said means.

6. An automated teller machine comprising:

a plurality of paper-money collecting means for collecting a plurality of different kinds of paper-money;

means for reading characteristics of said plurality of different kinds of paper-money at a time of taking paper-money into said machine via a paper-money input and output opening and at a time of discharging paper-money from said machine via said paper-money input and output opening;

means for storing said characteristics that have been read in correspondence to said plurality of paper-money collecting means;

means for temporarily storing paper-money for which said characteristics could not be read at a time of taking paper-money into said machine;

means for returning paper-money that has been stored in said temporary storing means to said paper-money input and output opening;

means for managing stock levels of paper-money in said plurality of paper-money collecting means; and means for controlling each of said means.

7. An automated teller machine comprising:

a plurality of paper-money collecting means for collecting a plurality of different kinds of paper-money;

means for reading characteristics of said plurality of different kinds of paper-money at a time of taking paper-money into said machine and at a time of discharging paper-money from said machine;

means for storing said characteristics that have been read in correspondence to said plurality of paper-money collecting means;

means for specifying paper-money for which said characteristics could not be read at a time of discharging paper-money from said machine;

means for storing said paper-money for which said characteristics could not be read at a time of discharging paper-money from said machine;

means for managing stock levels of paper-money in said plurality of paper-money collecting means; and means for controlling each of said means.

* * * * *